United States Patent
Nomura et al.

(10) Patent No.: US 12,536,254 B2
(45) Date of Patent: Jan. 27, 2026

(54) AUTHENTICATION MANAGEMENT DEVICE AND AUTHENTICATION MANAGEMENT METHOD

(71) Applicant: DENSO CORPORATION, Kariya (JP)

(72) Inventors: Hajime Nomura, Kariya (JP); Yusuke Tanaka, Kariya (JP); Yuka Ito, Kariya (JP); Takanari Makita, Kariya (JP)

(73) Assignee: DENSO CORPORATION, Kariya (JP)

( * ) Notice: Subject to any disclaimer, the term of this patent is extended or adjusted under 35 U.S.C. 154(b) by 465 days.

(21) Appl. No.: 17/485,556

(22) Filed: Sep. 27, 2021

(65) Prior Publication Data

US 2022/0100827 A1   Mar. 31, 2022

(30) Foreign Application Priority Data

Sep. 30, 2020   (JP) .................................. 2020-165361

(51) Int. Cl.
| | | |
|---|---|---|
| *G06F 21/31* | (2013.01) | |
| *G06F 21/45* | (2013.01) | |
| *G06F 21/57* | (2013.01) | |

(52) U.S. Cl.
CPC .............. *G06F 21/31* (2013.01); *G06F 21/45* (2013.01); *G06F 21/57* (2013.01); *G06F 2221/2141* (2013.01)

(58) Field of Classification Search
CPC .......... G06F 21/31; G06F 21/45; G06F 21/57; G06F 2221/2141
See application file for complete search history.

(56) References Cited

U.S. PATENT DOCUMENTS

| | | | | |
|---|---|---|---|---|
| 9,736,147 B1* | 8/2017 | Mead | ...................... | G06F 21/31 |
| 2006/0049962 A1 | 3/2006 | Okada | | |
| 2006/0282660 A1* | 12/2006 | Varghese | .............. | G07F 7/1083 |
| | | | | 713/155 |

(Continued)

FOREIGN PATENT DOCUMENTS

| | | |
|---|---|---|
| JP | 2006-077431 A | 3/2006 |
| JP | 2017-001615 A | 1/2017 |

(Continued)

*Primary Examiner* — Luu T Pham
*Assistant Examiner* — Paul J Skwierawski
(74) *Attorney, Agent, or Firm* — Harness, Dickey & Pierce, P.L.C.

(57) ABSTRACT

An authentication management device includes an authenticator unit, a manager unit, and a verifier unit. The authenticator unit is configured to check an authentication status of a user of a vehicle and an authorization status of an operation related to the vehicle based on an authentication information of the user and an authorization information of the operation in response to an operation request given by the user, and transmit the operation request to a functional unit configured to realize the operation upon confirming that the user has been authenticated and the operation has been authorized. The verifier unit is configured notify the manager unit of a receipt of an invalid request upon determining that the operation request is invalid. Upon being notified of the receipt of the invalid request, the manager unit changes at least one of the authentication information or the authorization information corresponding to an invalid requester user.

11 Claims, 8 Drawing Sheets

(56) References Cited

U.S. PATENT DOCUMENTS

| | | | |
|---|---|---|---|
| 2014/0273964 A1* | 9/2014 | Noh | H04W 12/08 |
| | | | 455/411 |
| 2017/0337361 A1* | 11/2017 | Zhou | G06F 21/31 |
| 2019/0047586 A1 | 2/2019 | Sekine | |
| 2019/0306709 A1* | 10/2019 | Kim | H04L 63/0861 |
| 2021/0044976 A1* | 2/2021 | Avetisov | H04L 63/0815 |
| 2021/0112094 A1* | 4/2021 | Liu | H04W 12/121 |
| 2022/0024408 A1 | 1/2022 | Narumi | |
| 2022/0225471 A1* | 7/2022 | Zhang | G08G 5/53 |
| 2023/0160239 A1* | 5/2023 | Wagner | E05B 77/54 |
| | | | 70/277 |

FOREIGN PATENT DOCUMENTS

| | | |
|---|---|---|
| JP | 2019-034638 A | 3/2019 |
| JP | 2020-083181 A | 6/2020 |

\* cited by examiner

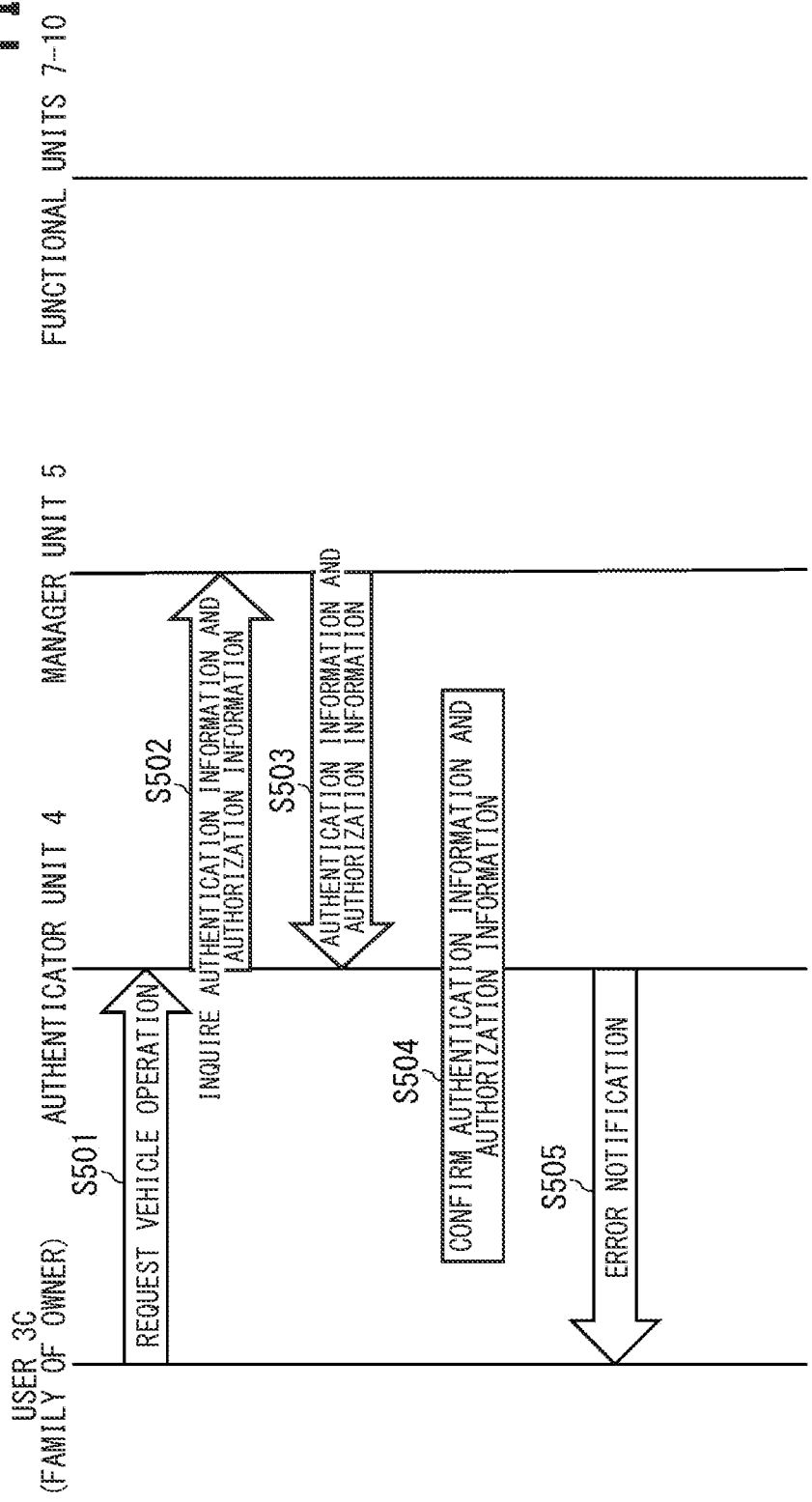

AUTHENTICATION MANAGEMENT DEVICE AND AUTHENTICATION MANAGEMENT METHOD

CROSS REFERENCE TO RELATED APPLICATION

This application is based on and incorporates herein by reference Japanese Patent Application No. 2020-165361 filed on Sep. 30, 2020.

TECHNICAL FIELD

The present disclosure relates to an authentication management device and an authentication management method for managing authentication statuses of users of a vehicle.

BACKGROUND

Vehicles are equipped with a variety of devices connected with each other through a network. The user of such a vehicle undergoes authentication based on one or several different authentication methods, and the user can operate various devices when the user is authenticated.

SUMMARY

According to a first aspect of the present disclosure, an authentication management device includes an authenticator unit, a manager unit, and a verifier unit. The authenticator unit is configured to check an authentication status of a user of a vehicle and an authorization status of an operation related to the vehicle based on an authentication information related to authentication of the user and an authorization information related to authorization of the operation in response to an operation request given by the user to request the operation, and transmit the operation request to a functional unit configured to realize the operation upon confirming that the user has been authenticated and the operation has been authorized. The manager unit is configured to manage the authentication status of the user and the authorization status of the operation by the user. The verifier unit is configured to verify validity of the operation request, and notify the manager unit of a receipt of an invalid request upon determining that the operation request is invalid. Upon being notified of the receipt of the invalid request, the manager unit changes, in accordance with a predetermined policy, at least one of the authentication information or the authorization information corresponding to an invalid requester user who gave the operation request determined as invalid by the verifier unit.

According to a second aspect of the present disclosure, a method of managing authentication includes: checking an authentication status of a user of a vehicle and an authorization status of an operation related to the vehicle based on an authentication information related to authentication of the user and an authorization information related to authorization of the operation in response to an operation request given by the user to request the operation; transmitting the operation request to a functional unit configured to realize the operation upon confirming that the user has been authenticated and the operation has been authorized; managing the authentication status of the user and the authorization status of the operation by the user; verifying validity of the operation request; and notifying of a receipt of an invalid request upon determining that the operation request is invalid. The managing includes changing, in accordance with a predetermined policy, at least one of the authentication information or the authorization information corresponding to an invalid requester user who gave the operation request determined as invalid upon being notified of the receipt of the invalid request.

According to a third aspect of the present disclosure, an authentication management device comprising at least one processor, the at least one processor configured to: check an authentication status of a user of a vehicle and an authorization status of an operation related to the vehicle based on an authentication information related to authentication of the user and an authorization information related to authorization of the operation in response to an operation request given by the user to request the operation; transmit the operation request to a functional unit configured to realize the operation upon confirming that the user has been authenticated and the operation has been authorized; manage the authentication status of the user and the authorization status of the operation by the user; verify validity of the operation request; notify of a receipt of an invalid request upon determining that the operation request is invalid; and change, in accordance with a predetermined policy, at least one of the authentication information or the authorization information corresponding to an invalid requester user who gave the operation request determined as invalid upon being notified of the receipt of the invalid request.

BRIEF DESCRIPTION OF THE DRAWINGS

FIG. 9 is a sequence diagram for explaining the authentication management method according to the embodiment and illustrating processes implemented by units in a third specific example.

DETAILED DESCRIPTION

In a general authentication management technique, users given the authority for the operations of various devices, and the operation authority is limited by identifying the user at the user authentication stage. In such a vehicle, especially for devices connected to an open network, it may be necessary to take measures to protect the operation of the devices and the information in the devices against various attacks from the outside. The attacks from the outside include, for example, a type of attack in which a malicious third party impersonating an authenticated legitimate user invades the network and operates the devices. If the authentication method is only a physical key or FOB key, countermeasures may include to lock the target key, but if the user authentication method is diversified due to the use of biometric authentication, smartphone authentication, etc., locking the authentication method itself may not be sufficient.

Hereinafter, an embodiment of an authentication management device and an authentication management method with reference to the drawings.

Figure 1:
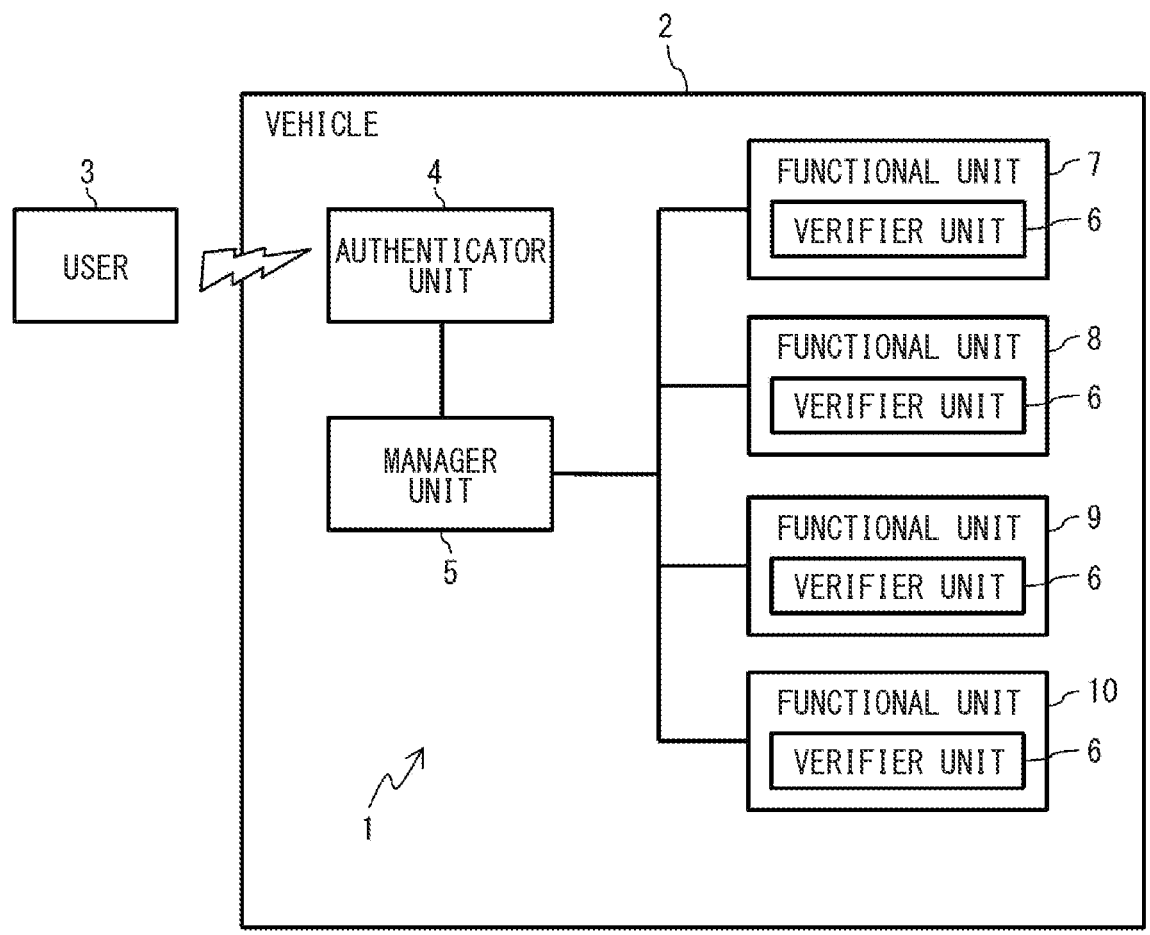
FIG. 1 is a schematic diagram illustrating an authentication management device according to an embodiment.

As shown in FIG. 1, the authentication management device 1 is installed into a vehicle 2 such as an automobile to manage an authentication status of a user 3 of the vehicle 2 by the authentication management method including procedures described later. The authentication management device 1 includes an authenticator unit 4, a manager unit 5, a verifier unit 6, and the like. When an operation request to perform a certain operation relative to the vehicle 2 is given by the user 3 of the vehicle 2 to the authenticator unit 4, the authenticator unit 4 checks the authentication status of the user 3 and an authorization status of the operation based on the authentication information relative to an authentication of the user 3 and an authorization information relative to an authorization of the operation.

The authenticator unit 4 is configured to perform authentication based on at least one of several different authentication methods, such as biometrics, smartphone authentication, etc., as well as physical key or FOB key. The authenticator unit 4 includes a reader device such as an NFC (near field communication) device and an authentication device configured to authenticate the user 3 by checking the reading results. The certain operation relative to the vehicle 2 includes, for example, locking and unlocking the door locks, opening and closing the doors, starting and stopping the engine, operating the air conditioner, operating the navigation system, operating the audio equipment, and various operations related to automatic driving.

In addition to the owner of the vehicle 2, family members of the owner are assumed to be the users 3, and for each user, the operating authority for various operations, i.e., permission or prohibition of operations, is set. The authorization information for the operation includes information that indicates the operation authority for each user. When it is confirmed that the user 3 has been authenticated and the operation requested by the user 3 has been authorized, the authenticator unit 4 transmits the operation request given by the user 3 to the functional unit that realizes the corresponding operation among the functional units 7-10 installed in the vehicle 2. The processes executed by the authenticator unit 4 corresponds to an authentication procedure.

Although four functional units 7-10 are shown in FIG. 1, the number of functional units may be three or less, or five or more. The functional units 7-10 include operation programs, or applications, that are executed by various devices such as electronic control units installed in the vehicle 2 to realize predetermined operations. In the present disclosure, the electronic control unit may be referred to as an ECU. The functional units 7-10 includes in-vehicle devices such as ECUs mounted on the vehicle 2 to realize predetermined operations. The authenticator unit 4, the manager unit 5, and the functional units 7-10 are connected with each other through a network installed in the vehicle 2 to transmit and receive data between them.

The manager unit 5 is configured to manage the authentication status of the user 3 and the authorization status of the operation by the user 3. The manager unit 5 is included in the ECU mounted on the vehicle 2. The manager unit 5 is implemented in software manner that a CPU included in the ECU executes a computer program stored in a non-transitory tangible storage medium and performs a process corresponding to the computer program. Alternatively, at least a part of the manager unit 5 may be implemented in hardware manner. The processes executed by the manager unit 5 corresponds to a management procedure.

Each of the functional units 7-10 includes the verifier unit 6 configured to verify the validity of the operation request transmitted from the authenticator unit 4. The verifier unit 6 is included in the application when the functional unit 7-10 is an application. When the functional unit 7-10 is the in-vehicle device, the verifier unit 6 is implemented in software manner that a CPU included in the in-vehicle device executes a computer program stored in a non-transitory tangible storage medium and performs a process corresponding to the computer program. Alternatively, at least a part of the verifier unit 6 may be implemented in hardware manner. The processes executed by the verifier unit 6 corresponds to a verification procedure.

When the verifier unit 6 detects that the operation request is invalid, the verifier unit 6 notifies the manager unit 5 of the reception of an invalid request, which indicates that the operation request given by the user 3 is invalid. The verifier unit 6 is configured to verify the validity of the operation request based on at least one of the following three verification methods.

(1) First Verification Method

In a first verification method, the verifier unit 6 checks the current state of the vehicle 2, and determines that the operation request is valid when the requested operation is feasible in light of the state of the vehicle 2. In contrast, the verifier unit 6 determines that the operation is invalid when the requested operation is not feasible in light of the state of the vehicle 2. For example, when the verifier unit 6 is given the operation request that requires the deactivation of automatic driving despite the absence of the driver in the driver's seat, the verifier unit 6 determines that the operation request is invalid.

(2) Second Verification Method

In a second verification method, the verifier unit 6 checks the current state of the vehicle 2, and determines that the operation request is valid when the requested operation should be realized in light of the state of the vehicle 2. In contrast, the verifier unit 6 determines that the operation is invalid when the requested operation should not be realized in light of the state of the vehicle 2. For example, when the verifier unit 6 is given the operation request to open a door even though the vehicle 2 is in motion, the verifier unit 6 determines that the operation request is invalid.

(3) Third Verification Method

In a third verification method, the verifier unit 6 compares the operation request with usual operation pattern of the user 3, and determines that the operation request is valid when the requested operation is in accordance with the usual operation pattern. In contrast, the verifier unit 6 determines that the operation request is invalid when the requested operation is not in accordance with the usual operation pattern. For example, the verifier unit 6 determines that the operation request is invalid when the vehicle 2 is requested to go to a place where the user 3 does not usually go. For example, the verifier unit 6 determines that the operation request is invalid when the verifier unit 6 is given an operation request to set a place where the user 3 would not usually go to as a destination for a navigation device.

When the verifier unit 6 determines that the operation request is invalid, the functional unit 7-10 executes a failsafe process, which is the action taken upon receiving an invalid request. Specific examples of the fail-safe process include the following: stop automatic driving and stop the vehicle 2 on the shoulder of the road; when there is a request to stop a certain control, do not stop the control if stopping the control would cause a safety problem; and when there is a request to execute a certain control, do not execute the control if executing the control would cause a safety problem.

Figure 2:
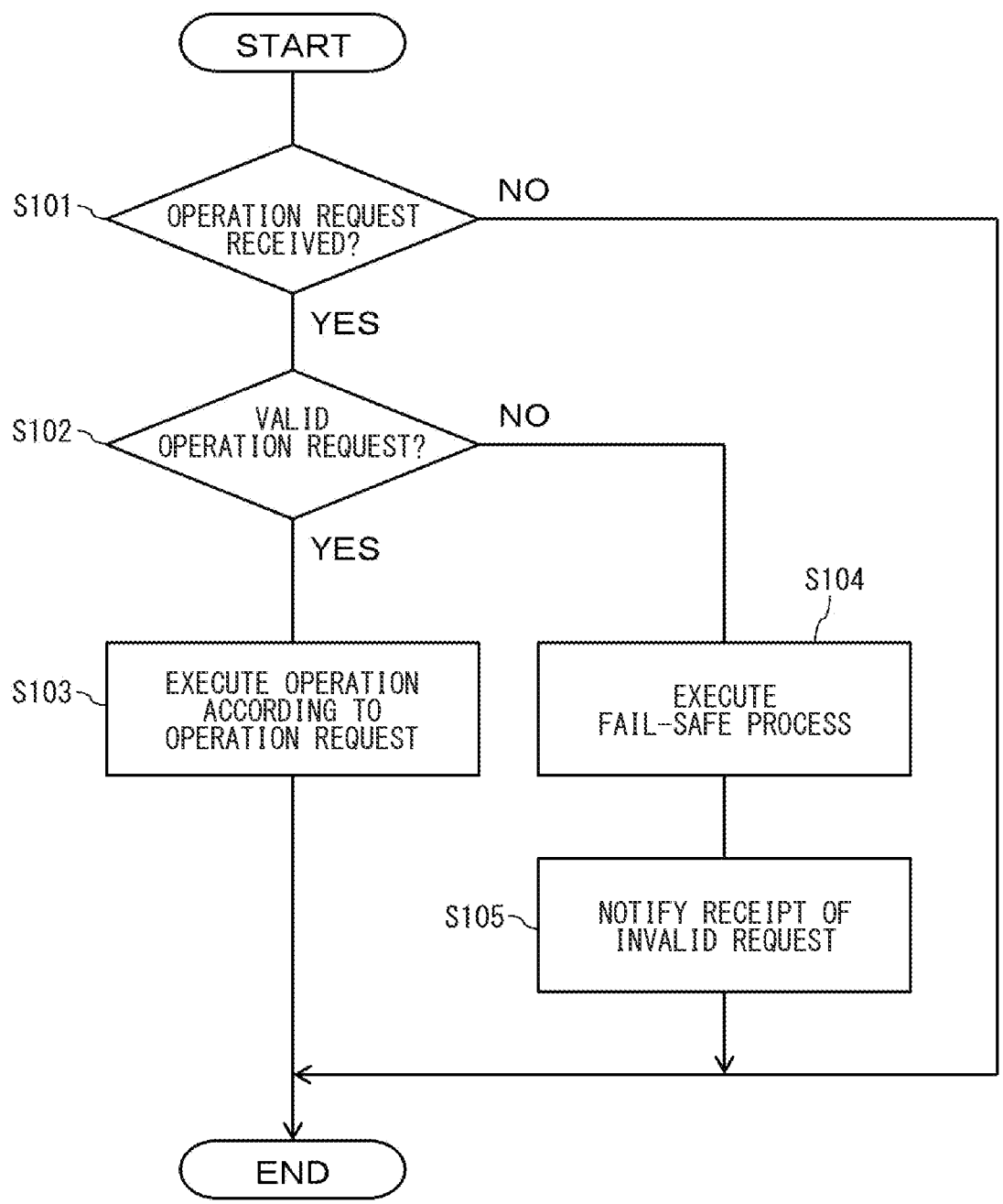
FIG. 2 is a flowchart illustrating an example of processes executed by functional units according to the embodiment.

The specifics of the processes performed by functional units 7-10, including the verifier units 6, are shown in FIG. 2, for example. First, it is determined whether the operation request is transmitted from the authenticator unit 4 in step S101. When the operation request is not transmitted, the result is "NO" in step S101 and the process ends. In contrast, when the operation request is transmitted, the result is "YES" in step S101 and the process proceeds to step S102.

In step S102, the verifier unit 6 verifies the validity of the transmitted operation request. That is, the verifier unit 6 determines whether the transmitted operation request is valid. When the transmitted operation request is valid, the result is "YES" in step S102 and the process proceeds to step S103. In step S103, the operation corresponding to the transmitted operation request is executed. After the execution in step S103, the process ends. In contrast, when the transmitted operation request is invalid, the result is "NO" in step S102 and the process proceeds to step S104. In step S104, the fail-safe process is executed. After the execution in step S104, the process proceeds to step S105. In step S105, the manager unit 5 is notified of the receipt of invalid request. After the execution in step S105, the process ends.

When the manager unit 5 is notified by the verifier unit 6 that the invalid request has been received, the manager unit 5 changes at least one of the authentication information and the authorization information corresponding to the invalid requester user, which is the user 3 who gave the operation request that was determined as invalid by the verifier unit 6, in accordance with a predetermined policy. For the change of the authentication information and the authorization information by the manager unit 5, any of the following four changing methods can be adopted.

(1) First Changing Method

In a first changing method, when the manager unit 5 is notified of the receipt of the invalid request, the manager unit 5 changes the authentication information such that the authentication status of the invalid requester user to be an unauthenticated state where the user is not authenticated. The manager unit 5 maintains the state in which the authentication status is changed to the unauthenticated state until authentication is requested again by the user who made the invalid request.

(2) Second Changing Method

In a second changing method, when the manager unit 5 is notified of the receipt of the invalid request, the manager unit 5 changes the authentication information such that the authentication status of the invalid requester user to be an abnormal state, which is a state where an abnormality related to authentication has occurred. The manager unit 5 maintains the state where the authentication status is changed to the abnormal state until an action for removing the abnormality is taken, which is different from the action taken for the authentication.

(3) Third Changing Method

In a third changing method, when the manager unit 5 is notified of the receipt of the invalid request, the manager unit 5 changes the authorization information such that at least one operation by the invalid requester user is placed in an unauthenticated state where the execution of the at least one operation is not allowed. In this case, the manager unit 5 is configured to change the authorization information such that the operation set to be the unauthorized state increases each time when the receipt of the invalid request by the same invalid requester user is notified. In this case, the manager unit 5 may be configured to change the authorization information such that the operation having greatest impact on safety is set to be the unauthorized state in order.

(4) Fourth Changing Method

In a fourth changing method, as in the first changing method, when the manager unit 5 is notified of the receipt of the invalid request, the manager unit 5 changes the authentication information such that the authentication status of the invalid requester user is set to be the unauthenticated state, and maintains that state until authentication is requested again by the invalid requester user. When the number of the change that sets the authentication status of the same invalid requester user to be the unauthenticated state reaches a predetermined number, the manager unit 5 changes the authentication status of the invalid requester user to be the abnormal state, and maintains that state until the action for removing the abnormality is taken.

Figure 3:
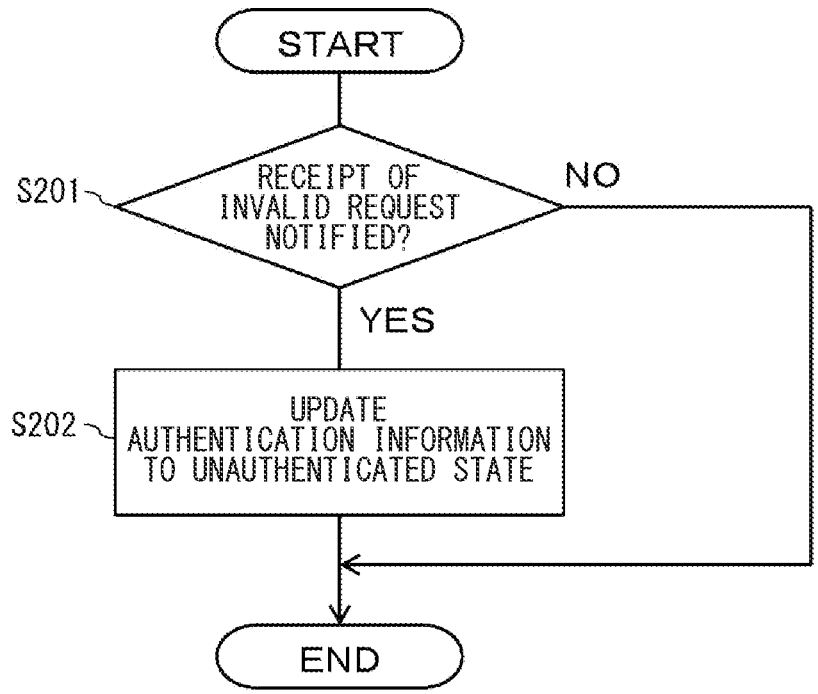
FIG. 3 is a flowchart illustrating an example of processes executed by a manager unit when a first changing method is adopted in the embodiment.

The specifics of the processes performed by the manager unit 5 are shown in FIGS. 3-6, for example. FIG. 3 shows a process when the first changing method is adopted. In the process shown in FIG. 3, in step S201, it is determined whether the receipt of the invalid request is notified by the functional units 7-10. When the receipt of the invalid request is not notified, the result is "NO" in step S201 and the process ends. In contrast, when the receipt of the invalid request is notified, the result is "YES" in step S201 and the process proceeds to step S202. In step S202, the authentication information is updated such that the authentication status of the invalid requester user is set to be the unauthenticated state. After the execution in step S202, the process ends.

Figure 4:
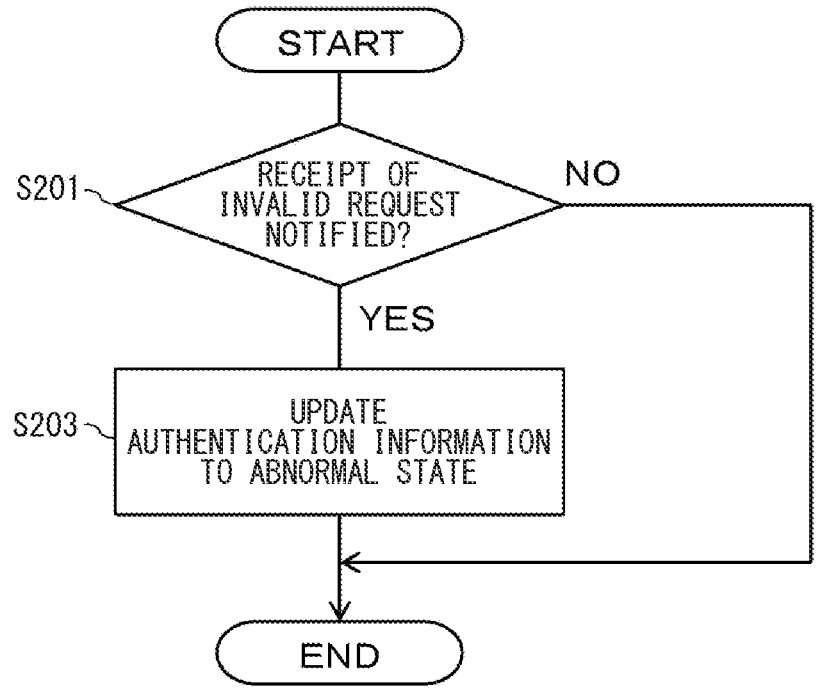
FIG. 4 is a flowchart illustrating an example of processes executed by the manager unit when a second changing method is adopted in the embodiment.
Figure 5:
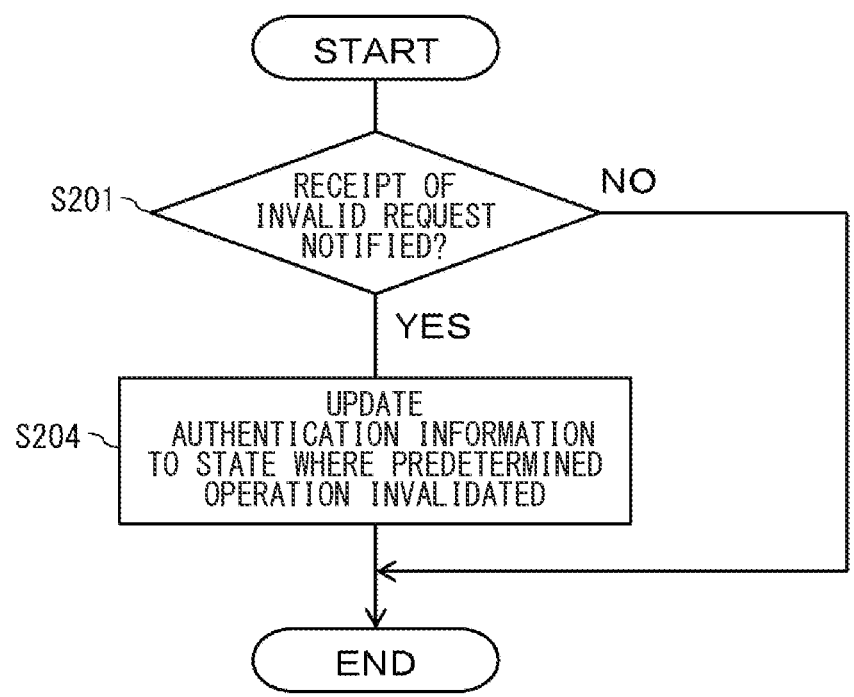
FIG. 5 is a flowchart illustrating an example of processes executed by the manager unit when a third changing method is adopted in the embodiment.

FIG. 4 shows a process when the second changing method is adopted. The process shown in FIG. 4 differs from the process shown in FIG. 3 in that step S203 is used instead of step S202. In step S203, the authentication information is updated such that the authentication status of the invalid requester user is set to be the abnormal state. FIG. 5 shows a process when the third changing method is adopted. The process shown in FIG. 5 differs from the process shown in FIG. 3 in that step S204 is used instead of step S202. In step S204, the authorization information is updated such that at least one of the operations by the invalid requester user is set to be the unauthorized state.

Figure 6:
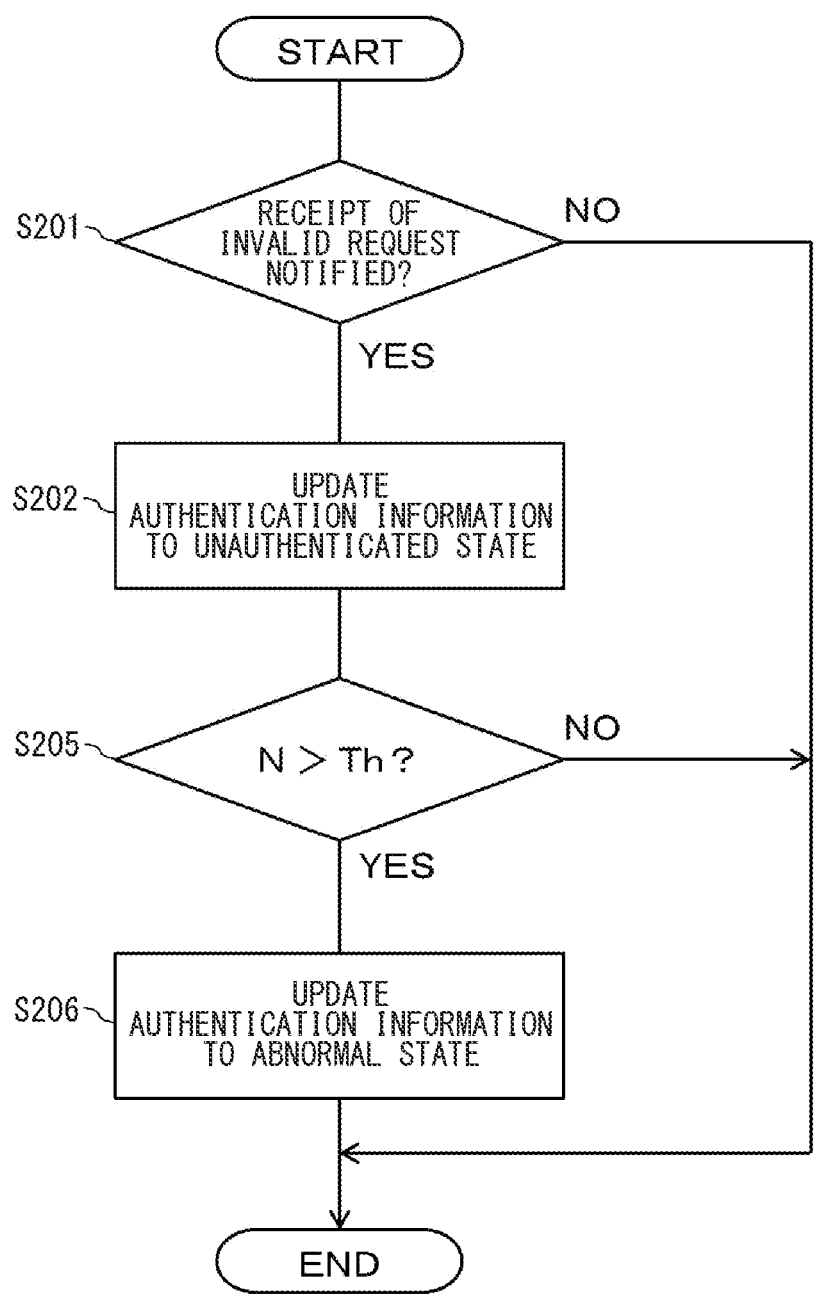
FIG. 6 is a flowchart illustrating an example of processes executed by the manager unit when a fourth changing method is adopted in the embodiment.

FIG. 6 shows a process when the fourth changing method is adopted. The process shown in FIG. 6 differs from the process shown in FIG. 3 in that steps S205 and S206 are added. In this case, when the result of the step S201 is "YES", the process proceeds to step S205. In step S205, it is determined whether a changing number N, which is the number of the change to set the authentication status of the same invalid requester user to be the unauthenticated state, reaches a predetermined threshold value Th. When the changing number N has not reached the threshold value Th, the result of step S205 is "NO" and the process ends.

In contrast, when the changing number N has reached the threshold value Th, the result of step S205 is "YES", and the process proceeds to step S206. In step S206, the authentication information is updated such that the authentication status of the invalid requester user is set to be the abnormal state. After the execution in step S206, the process ends. When the authenticator unit 4 is given the operation request by the invalid requester user after at least one of the authentication information or the authorization information is changed by the manager unit 5 as described above, the authenticator unit 4 determines whether the authenticator unit 4 transmits the operation request to the functional units 7-10 based on the changed authentication information and authorization information.

Next, the operation of the above configuration will be described with reference to FIGS. 7-9. The authentication management method realized by the authentication management device 1 of the present embodiment will be explained in accordance with three specific examples.

(1) First Specific Example

Figure 7:
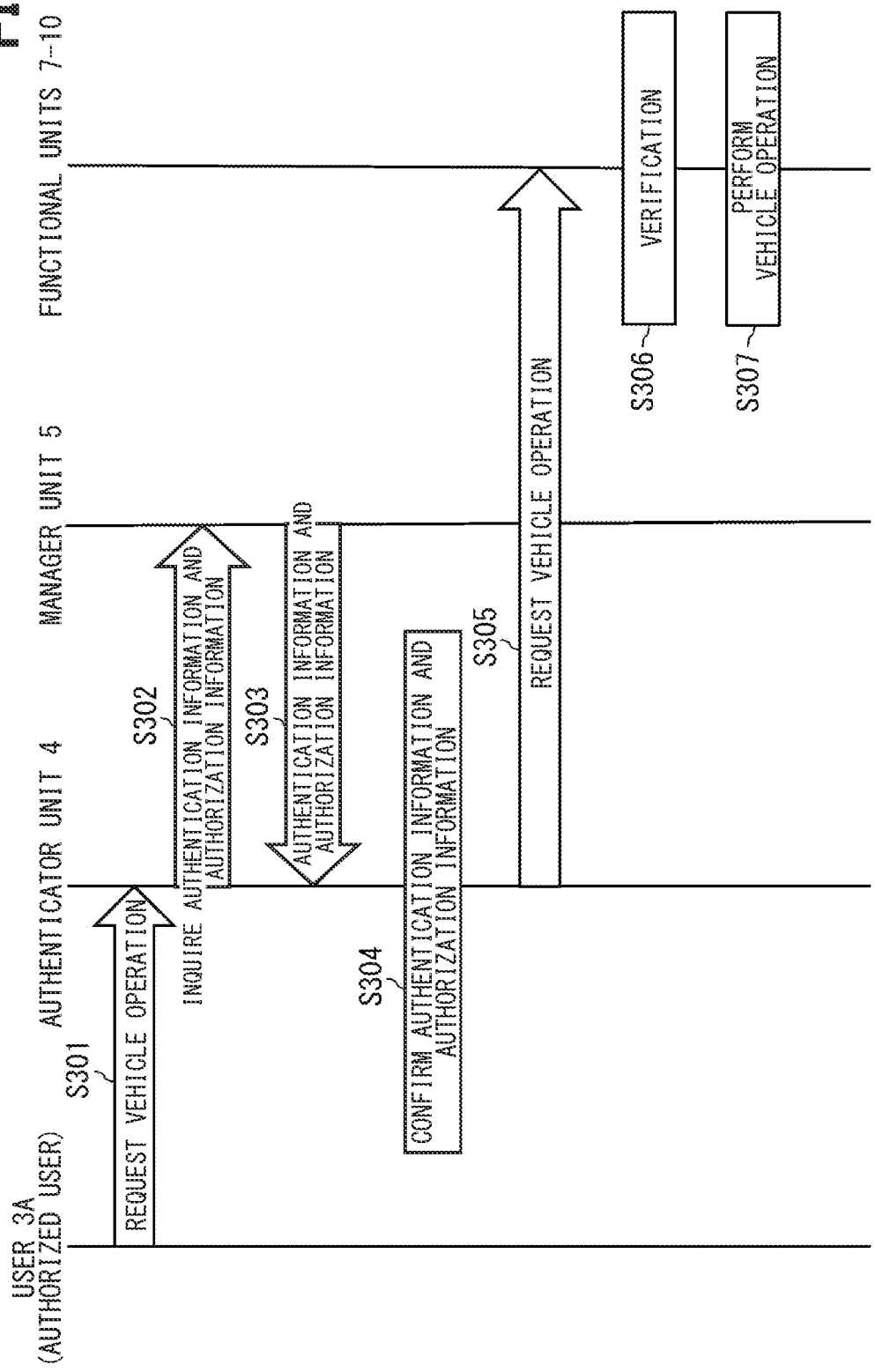
FIG. 7 is a sequence diagram for explaining an authentication management method according to the embodiment and illustrating processes implemented by units in a first specific example.

A first specific example is a case where a legitimate user 3, the owner of the vehicle 2, requests an authorized operation, and the process flow by the units in this case is shown in FIG. 7, for example. In this example, the legitimate user 3 is referred to as a user 3A. First, in step S301, the authenticator unit 4 is given by the user 3A the operation request to request a certain operation relative to the vehicle 2. In step S302, the authenticator unit 4 inquires the manager unit 5 of the authentication information and the authorization information of the user 3A.

In step S303, the authenticator unit 4 is given by the manager unit 5 the authentication information and the authorization information of the user 3A. In step S304, the authenticator unit 4 checks the authentication status of the user 3A and the authorization status of the operation requested by the user 3A. In this example, the user 3A is the legitimate user, and accordingly it is confirmed in step S304 that the user 3A has been authenticated and the operation requested by the user 3A has been authorized.

Accordingly, in step S305, the operation request given by the user 3A is transmitted from the authenticator unit 4 to the functional unit 7-10 that realizes the operation requested by the user 3A. In step S306, the validity of the transmitted operation request is verified by the verifier unit 6 of the functional unit 7-10. In this example, since the operation is requested by the user 3A who is the legitimate user, the verifier unit 6 determines that the operation request is valid. Accordingly, in step S307, the certain operation corresponding to the transmitted operation request is executed by the functional unit 7-10.

(2) Second Specific Example

Figure 8:
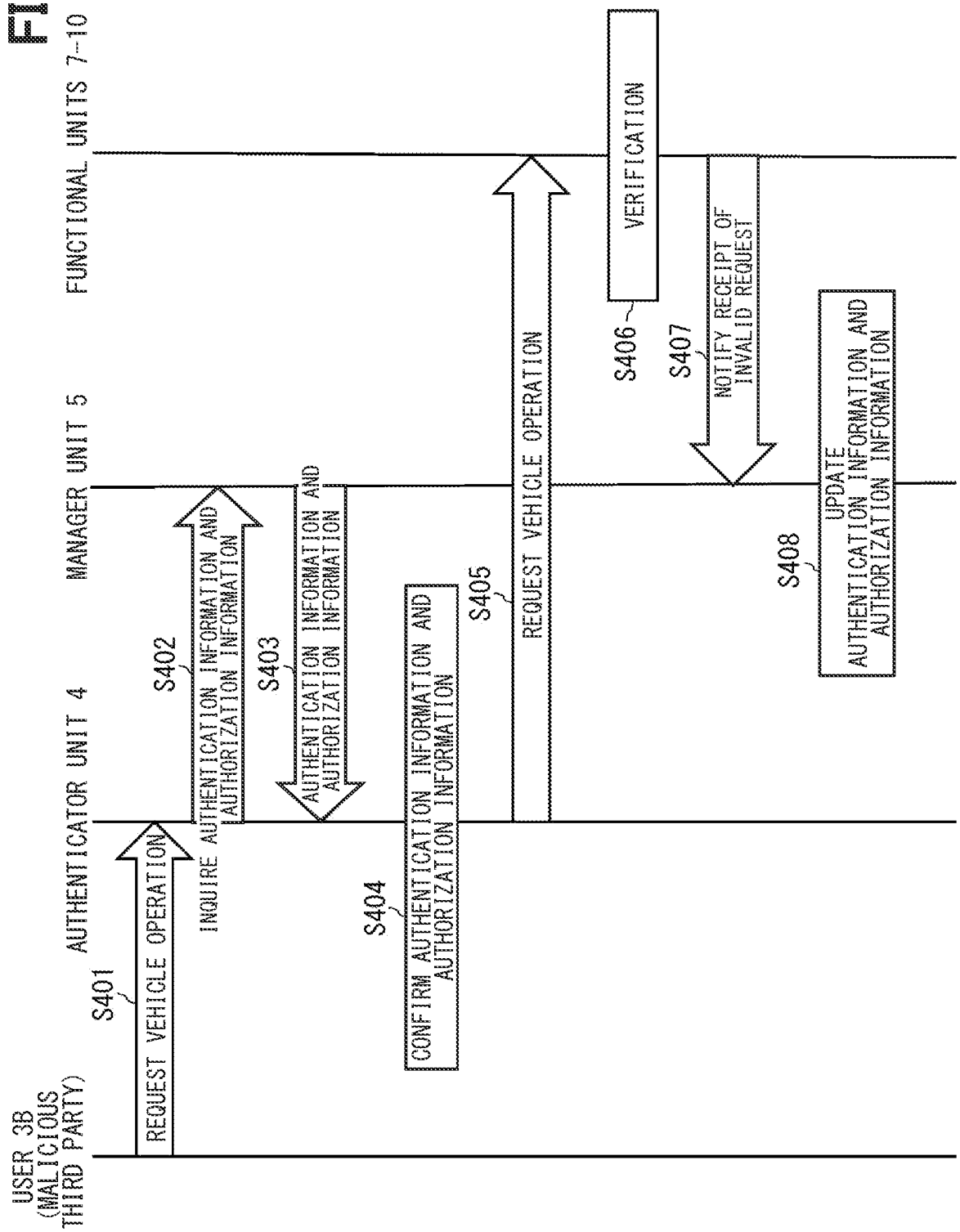
FIG. 8 is a sequence diagram for explaining the authentication management method according to the embodiment and illustrating processes implemented by units in a second specific example.

A second specific example is a case where a user 3, a malicious third party impersonating to be a legitimate user, requests an operation, and the process flow by the units in this example is shown in FIG. 8, for example. In this example, the user 3 who is the malicious third party is referred to as a user 3B. First, in step S401, the authenticator unit 4 is given by the user 3B the operation request to request a certain operation relative to the vehicle 2.

In step S402, the authenticator unit 4 inquires the manager unit 5 of the authentication information and the authorization information of the user 3B. In step S403, the authenticator unit 4 is given by the manager unit 5 the authentication information and the authorization information of the user 3B. In step S404, the authenticator unit 4 checks the authentication status of the user 3B and the authorization status of the operation requested by the user 3B.

In this example, even though the user 3B is the malicious third party, the user 3B impersonates the legitimate user. Therefore, in step S404, it is confirmed that the user 3B has been authenticated and the operation requested by the user 3B has been authorized. Accordingly, in step S405, the operation request given by the user 3B is transmitted from the authenticator unit 4 to the functional unit 7-10 that realizes the operation requested by the user 3B. In step S406, the validity of the transmitted operation request is verified by the verifier unit 6 of the functional unit 7-10.

In this case, since the operation is requested by the user 3B who is not the legitimate user, the verifier unit 6 determines that the operation request is invalid. Accordingly, in step S407, the functional unit 7-10 notifies the manager unit 5 of the receipt of the invalid request. At this time, the functional unit 7-10 executes the fail-safe process. In step S408, the manager unit 5 updates at least one of the authentication information or the authorization information corresponding to the user 3B.

(3) Third Specific Example

A third specific example is a case where a user 3 who is a family member such as a child of the legitimate user requests an unauthorized operation, and the process flow by the units in this example is shown in FIG. 9, for example. In this example, the user 3 who is the family member of the legitimate user is referred to as a user 3C. First, in step S501, the authenticator unit 4 is given by the user 3C the operation request to request a certain operation relative to the vehicle 2.

In step S502, the authenticator unit 4 inquires the manager unit 5 of the authentication information and the authorization information of the user 3C. In step S503, the authenticator unit 4 is given by the manager unit 5 the authentication information and the authorization information of the user 3C. In step S504, the authenticator unit 4 checks the authentication status of the user 3C and the authorization status of the operation requested by the user 3C.

In this example, even though the user 3C is the family member of the legitimate user, the user 3C requests the unauthorized operation. Therefore, in step S504, it is confirmed that the user 3C has been authenticated and the operation requested by the user 3C has not been authorized. Accordingly, in step S505, the authenticator unit 4 notifies the user 3C of an error that indicates that the requested operation is prohibited. Such error notifications can be implemented using displays, speakers, etc. mounted on the vehicle 2.

According to the above-described embodiment, even when the malicious third party impersonates the legitimate user 3 to request the certain operation, invalidity of the operation request given by the malicious third party can be detected by the verifier unit 6. When it is determined that the operation request is invalid, the receipt of the invalid request is notified by the verifier unit 6 to the manager unit 5, and the manager unit 5 changes at least one of the authentication information or the authorization information corresponding to the invalid requester user who is the malicious third party. In this way, it is possible to promptly take measures such as restricting the certain operation or prohibiting the certain operation for the malicious third party. Accordingly, the present embodiment has the effect of responding to attacks by malicious third parties who impersonate legitimate users 3.

When the manager unit 5 is notified of the receipt of the invalid request, the manager unit 5 changes the authentication information such that the authentication status of the invalid requester user is set to be the unauthenticated state, and maintains that state until authentication is requested again by the invalid requester user. In this way, it is possible to respond to attacks by malicious third parties impersonating legitimate users 3 without additional special processing related to authentication. When the manager unit 5 is notified of the receipt of the invalid request, the manager unit 5 changes the authentication information such that the authentication status of the invalid requester user is set to be the abnormal state, and maintains that state until the processes for removing the abnormality are taken. In this way, a malicious third party, the user who made the invalid request, will not be able to attack again once the authentication information has been changed to an abnormal state, unless special processes that differ from those for authentication are taken, thus security can be improved.

When the manager unit 5 is notified of the receipt of the invalid request, the manager unit 5 changes the authorization information such that at least one operation by the invalid requester user is placed in the unauthorized state. In this way, the invalid requester user who is a malicious third party will not be able to perform the certain operation once it has been unauthorized, thus security can be improved. Furthermore, the manager unit 5 is configured to change the authorization information so that the number of operations set to the unauthorized state is gradually increased each time the receipt of the invalid request corresponding to the same invalid requester user is notified. In this case, the manager unit 5 may be configured to change the authorization information such that the operation having greatest impact on safety is set to be the unauthorized state in order. In this way, each time the system is attacked by the invalid requester user who is a malicious third party, the operations that have the greatest impact on safety will be unauthorized in order, further improving safety.

The verifier unit 6 may erroneously determine that the operation requested by a legitimate user 3 is invalid. However, the possibility of the above misjudgments occurring in succession is very low. Therefore, the manager unit 5 may be configured to change the authentication information of the invalid requester user to be the abnormal state when the number of times that the authentication information has been changed such that the authentication status of the same invalid requester user is set to be the unauthenticated state reaches a predetermined number. Further, the manager unit 5 may be configured to maintain the state until processes for removing the abnormality are taken.

In this way, although the authentication status is set to be the unauthenticated state once when the above-mentioned misjudgment occurs in the verifier unit 6, the legitimate user 3 will be able to operate normally by being authenticated again when requesting subsequent operations. In contrast, the operations requested by a malicious third party impersonating the legitimate user 3 are likely to be determined to be invalid continuously. According to the changing method described above, the authentication information of a malicious third party is changed to the abnormal state after several times of the operation request, and then the malicious third party cannot attack again without the special processes that differ from the processes for the normal authentication request.

When the authenticator unit 4 is given the operation request by the invalid requester user after at least one of the authentication information or the authorization information is changed by the manager unit 5, the authenticator unit 4 determines whether the authenticator unit 4 transmits the operation request to all of the functional units 7-10 based on the changed authentication information and authorization information. In this way, when an operation request is determined as invalid by the verifier units 6 of at least one functional units 7-10, operation requests to another functional unit by the invalid requester user who gave the invalid operation request are limited or prohibited. Accordingly, response to attacks by malicious third parties can be surely performed.

Other Embodiments

The present disclosure is not limited to the embodiments that have been described above and illustrated in the drawings, but can arbitrarily be modified, combined, or expanded without departing from the gist of the present disclosure. Numerical values and the like shown in the above embodiments are examples and are not limited thereto.

In the above embodiment, the verifier unit 6 is provided in each of the functional units 7-10. However, the verifier unit 6 may be provided in at least one of the functional units 7-10. Further, the verifier unit 6 of the embodiment is included in the functional units 7-10. However, the verifier unit 6 may be independent from the functional units 7-10. The changing method in response to the invalid request is not limited to the above-described first to fourth changing methods. The manager unit 5 may change at least one of the authentication information or the authorization information corresponding to the invalid requester user in accordance with a predetermined policy in response to the notification of the receipt of the invalid request.

Although the present disclosure has been described in accordance with embodiments, it is understood that the present disclosure is not limited to such embodiments or structures. The present disclosure encompasses various modifications and variations within the scope of equivalents. In addition, various combinations and configurations, as well as other combinations and configurations that include only one element, more, or less, are within the scope and spirit of the present disclosure.

The controller and the techniques thereof according to the present disclosure may be implemented by one or more special-purposed computers. Such a special-purposed computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. The computer readable program may be stored, as instructions to be executed by a computer, in the memory which is a tangible non-transitory computer-readable medium. The memory may be provided by a semiconductor memory device or a programmable circuit.

Although the present disclosure has been fully described in connection with the preferred embodiments thereof with reference to the accompanying drawings, it is to be noted that various changes and modifications will become apparent to those skilled in the art.

Additional advantages and modifications will readily occur to those skilled in the art. The disclosure in its broader terms is therefore not limited to the specific details, representative apparatus, and illustrative examples shown and described.

What is claimed is:

1. An authentication management device comprising at least one processor, the at least one processor configured to:
check an authentication status of a user of a vehicle and an authorization status of an operation related to the vehicle based on an authentication information related to authentication of the user and an authorization information related to authorization of the operation in response to an operation request given by the user to request the operation;

transmit the operation request to a functional unit configured to realize the operation upon confirming that the user has been authenticated and the operation has been authorized;

manage the authentication status of the user and the authorization status of the operation by the user;

receive the operation request for which the user has been authenticated and the operation has been authorized;

verify, based on content of the operation request for which the user has been authenticated and the operation has been authorized, whether the operation request is valid; and notify of a receipt of an invalid request upon determining that the operation request is invalid, and upon being notified of the receipt of the invalid request, change, in accordance with a predetermined policy, at least one of the authentication information or the authorization information corresponding to an invalid requester user who gave the operation request determined as invalid, wherein the at least one processor is configured to change, upon being notified of the receipt of the invalid request, the authentication information such that at least one of the operations related to the vehicle by the invalid requester user is set to be an unauthorized state where an execution of the at least one of the operations related to the vehicle is unauthorized, the at least one processor is configured to change the authorization information to increase the operation which is set to be the unauthorized state each time when the receipt of the invalid request corresponding to the same invalid requester user is notified, the at least one processor is further configured to store the authentication information related to the authentication of each user of the vehicle and the authorization information including information that indicates operation authority for each user, and the at least one processor decides that the operation request is valid when the requested operation is feasible in light of a state of the vehicle, and decides that the operation request is invalid when the requested operation is not feasible in light of the state of the vehicle.

2. The authentication management device according to claim 1, wherein the at least one processor is configured to:

change, upon being notified of the receipt of the invalid request, the authentication information such that the authentication status of the invalid requester user is set to be an unauthenticated state where the invalid requester user is unauthenticated, and maintain the unauthenticated state until a request for authentication is given by the invalid requester user.

3. The authentication management device according to claim 1, wherein the at least one processor is configured to:

change, upon being notified of the receipt of the invalid request, the authentication information such that the authentication status of the invalid requester user is set to be an abnormal state indicating that there is an abnormality in authentication, and maintain the abnormal state until a process for removing the abnormality, which is different from a process related to a request for authentication, is performed.

4. The authentication management device according to claim 2, wherein the at least one processor is configured to:

change the authentication information such that the authentication status of the invalid requester user is set to be an abnormal state indicating that there is an abnormality in authentication when a number of times to change the authentication information such that the authentication status of the same invalid requester user is set to be the unauthenticated state reaches a predetermined number, and maintain the abnormal state until a process for removing the abnormality, which is different from a process related to a request for authentication, is performed.

5. The authentication management device according to claim 1, wherein the at least one processor is configured to, in response to the operation request given by the invalid requester user after changing at least one of the authentication information or the authorization information is changed, determine whether to transmit the operation request based on the changed authentication information and authorization information.

6. A method of managing authentication comprising:

checking an authentication status of a user of a vehicle and an authorization status of an operation related to the vehicle based on an authentication information related to authentication of the user and an authorization information related to authorization of the operation in response to an operation request given by the user to request the operation;

transmitting the operation request to a functional unit configured to realize the operation upon confirming that the user has been authenticated and the operation has been authorized;

managing the authentication status of the user and the authorization status of the operation by the user;

receiving the operation request for which the user has been authenticated and the operation has been authorized;

verifying, based on content of the operation request for which the user has been authenticated and the operation has been authorized, whether the operation request is valid; and notifying of a receipt of an invalid request upon determining that the operation request is invalid, wherein the managing includes changing, in accordance with a predetermined policy, at least one of the authentication information or the authorization information corresponding to an invalid requester user who gave the operation request determined as invalid upon being notified of the receipt of the invalid request, the managing includes changing, upon being notified of the receipt of the invalid request, the authentication information such that at least one of the operations related to the vehicle by the invalid requester user is set to be an unauthorized state where an execution of the at least one of the operations related to the vehicle is unauthorized, the managing includes changing the authorization information to increase the operation which is set to be the unauthorized state each time when the receipt of the invalid request corresponding to the same invalid requester user is notified, the managing includes storing the authentication information related to the authentication of each user of the vehicle and the authorization information including information that indicates operation authority for each user, and the managing includes deciding that the operation request is valid when the requested operation is feasible in light of a state of the vehicle, and deciding that the operation request is invalid when the requested operation is not feasible in light of the state of the vehicle.

7. The authentication management device according to claim 1, wherein the at least one processor decides that the operation request is valid when it is determined that the requested operation should be realized in light of a state of the vehicle, and decides that the operation is invalid when it is determined that the requested operation should not be realized in light of the state of the vehicle.

8. The authentication management device according to claim 1, wherein the at least one processor decides that the operation request is valid when the requested operation is in accordance with a usual operation pattern of the user, and decides that the operation request is invalid when the requested operation is not in accordance with the usual operation pattern.

9. The authentication management device according to claim 1, wherein the operation related to the vehicle includes at least one of lock and unlock of door locks of the vehicle, open and close of doors of the vehicle, start and stop of an engine of the vehicle, an operation of an air conditioner of the vehicle, an operation of a navigation system of the vehicle, an operation of an audio equipment of the vehicle, and an operation related to automatic driving.

10. The authentication management device according to claim 1, wherein the at least one processor decides that the operation request is valid when the requested operation is in accordance with a predetermined operation pattern of the user, and decides that the operation request is invalid when the requested operation is not in accordance with the predetermined operation pattern.

11. The authentication management device according to claim 1, wherein when the at least one processor verifies the validity of the operation request, the at least one processor determines whether the operation request corresponds to at least one of following cases:

an operation request requiring deactivation of automatic driving of the vehicle in absence of the user as a driver in a driver's seat;

an operation request opening a door in a state where the vehicle is in motion;

an operation request causing the vehicle to go to a place where the user does not usually go; and an operation request setting a place where the user does not usually go to as a destination for a navigation device of the vehicle.

* * * * *